United States Patent [19]

Bousaid

[11] 4,230,182

[45] Oct. 28, 1980

[54] OIL RECOVERY METHOD EMPLOYING ALTERNATE SLUGS OF SURFACTANT FLUID AND FRESH WATER

[75] Inventor: Issam S. Bousaid, Houston, Tex.

[73] Assignee: Texaco Inc., White Plains, N.Y.

[21] Appl. No.: 71,220

[22] Filed: Aug. 30, 1979

[51] Int. Cl.$^3$ .............................................. E21B 43/22
[52] U.S. Cl. ..................................... 166/273; 166/274
[58] Field of Search ............ 166/273, 274, 275, 305 R

[56] References Cited

U.S. PATENT DOCUMENTS

| | | | |
|---|---|---|---|
| 2,927,637 | 3/1960 | Draper | 166/273 |
| 2,988,142 | 6/1961 | Maly | 166/273 |
| 3,036,630 | 5/1962 | Bernard et al. | 166/273 |
| 3,134,433 | 5/1964 | Boquet | 166/273 |
| 3,208,517 | 9/1965 | Binder, Jr. et al. | 166/274 |
| 3,346,047 | 10/1967 | Townsend et al. | 166/273 |
| 3,376,925 | 4/1968 | Coppel | 166/274 |
| 3,421,582 | 1/1969 | Fallgatter | 166/273 |
| 3,500,920 | 3/1970 | Raifsnider | 166/273 |
| 3,500,922 | 3/1970 | O'Brien | 166/273 |
| 3,612,182 | 10/1971 | Raifsnider | 166/273 X |

*Primary Examiner*—Stephen J. Novosad
*Assistant Examiner*—George A. Suchfield
*Attorney, Agent, or Firm*—C. G. Ries; Robert A. Kulason; Jack H. Park

[57] ABSTRACT

Disclosed is a petroleum recovery method useful for recovering petroleum from subterranean formations containing water having high salinity and/or divalent ion concentration, employing an aqueous surfactant-containing fluid which is designed to effect low surface tension displacement of petroleum in the formation in the presence of high salinity water. The improvement comprises injecting the total desired volume of surfactant in the form of a plurality of relatively small slugs of surfactant fluid, and alternatingly injecting similarly small pore volume slugs of fluid comprising fresh water, e.g. salinities less than 10,000 parts per million and preferably less than 1000 parts per million total dissolved solids. The surfactant fluid comprises water containing at least one surfactant and up to 5.0 volume percent hydrocarbon, said hydrocarbon optionally containing an oil soluble silicone compound dissolved therein. The total pore volume of surfactant-containing fluid injected is ordinarily from 0.01 to 1.00 and preferably from 0.20 to 0.50 pore volumes. This total amount of surfactant fluid is injected in from 2 to 15 and preferably from 3 to 6 separate discrete slugs. Each slug of surfactant fluid is followed by injecting a quantity of fresh water. The volume of each fresh water slug is ordinarily from 0.5 to 5.0 and preferably 1 to 2 times the volume of the preceding surfactant fluid slug.

32 Claims, No Drawings

OIL RECOVERY METHOD EMPLOYING ALTERNATE SLUGS OF SURFACTANT FLUID AND FRESH WATER

FIELD OF THE INVENTION

This invention concerns a surfactant waterflooding petroleum recovery process.

BACKGROUND OF THE INVENTION

Petroleum is found in subterranean formations or reservoirs in which it has accumulated, and recovery is initally accomplished by pumping or permitting the petroleum to flow to the surface of the earth through wells drilled into and in fluid communication with the subterranean reservoirs. Petroleum can be recovered from the subterranean formations only if certain conditions exist. There must be an adequately high concentration of petroleum in the formation, and there must be adequate permeability or interconnected flow channel throughout the formation to permit the flow of fluid therethrough if sufficient pressure is applied to the fluid. When the subterranean, petroleumcontaining formation has natural energy present in the form of an active, underlying or edge water drive, solution gas, or a high pressure gas cap above the petroleum within the reservoir, the natural energy is utilized to recovery petroleum in what is commonly referred to as primary recovery. In this primary phase of petroleum recovery, petroleum flows to wells drilled into and completed in the formation, the petroleum being displaced through the formation toward the wells by the naturally occurring energy in the reservoir. When the natural energy source is depleted, or in the instance of those formations which do not originally contain sufficient natural energy to permit primary recovery operations, some form of supplemental recovery process must be applied to the reservoir. Supplemental recovery is frequently referred to as secondary or tertiary recovery, although in fact it may be primary, secondary or tertiary in sequence of employment. Petroleum recovery involving the injection of water into the formation for the purpose of displacing petroleum toward the production well, commonly referred to as waterflooding, is the most economical and widely practiced form of supplemental recovery. Water does not displace petroleum with high efficiency, however, since water and oil are immiscible and the interfacial tension between water and oil is quite high. Persons skilled in the art of oil recovery have recognized this limitation of waterflooding and many additives have been described in the literature for incorporating in the flood water for the purpose of decreasing the interfacial tension between the injection water and the formation petroleum. For example, petroleum sulfonates have been disclosed in many references for use in oil recovery operations, but petroleum sulfonates have limitations with respect to formation water salinity, hardness and other factors which frequently restrict their usefulness. U.S. Pat. No. 3,811,504 describes a three component surfactant system comprising an anionic surfactant such as an alkyl or alkylaryl sulfonate, a nonionic surfactant such as a polyethoxylated alkylphenol, and an alkylpolyethoxy sulfate. U.S. Pat. No. 3,811,505 describes a dual surfactant system employing an anionic surfactant such as an alkyl or alkylaryl sulfonate or phosphate, plus a nonionic surfactant such as polyethoxylated alkylphenol or polyethoxylated aliphatic alcohol. These systems permit the use of a surfactant flooding process in formations containing from 500 to 12,000 parts per million polyvalent ions such as calcium and magnesium. The foregoing process employing nonionic surfactants such as ethoxylated and sulfated surfactants are effective at high salinities, but have a limited temperature tolerance range. Surfactant waterflooding processes employing alkylpolyalkoxyalkylene sulfonates or alkyarylpolyalkoxyalkylene sulfonates are described in U.S. Pat. Nos. 3,827,497; 3,890,239; and 4,018,278. These surfactant mixtures are especially suitable for use in surfactant waterflood operations being applied to formations whose temperatures exceed the useful limits of nonionic surfactants and polyethoxylated and sulfated surfactants, and are additionally effective for use in formations containing very high salinity formation water. Numerous prior art references teach the use of surfactant fluids comprising water, a surfactant such as those discussed above, and a hydrocarbon dispersed in the aqueous solution, forming an emulsion or micellar dispersion.

While the above described surfactant waterflood oil recovery processes have produced various degrees of encouraging results in laboratory experiments, field application of these processes have generally been less successful than expected, and the amount of additional oil recovered has thus far been insufficient to justify the cost of the surfactant materials incorporated in the flood water. A substantial cause for the disappointing results obtained in field application of surfactant waterflood oil recovery processes described in the literature are believed to be the loss of surfactant from the aqueous surfactant fluid to the formation as the fluid passes through the flow channels of the formation. This loss of surfactant is at least in part related to the adsorption of the surface active agents from the aqueous fluid onto the mineral surface of the formation matrix. It is also believed that some loss of surfactant to the formation occurs as a consequence of surfactant fluid entering dead-end flow channels of the formation, and remaining trapped in those flow channels and unavailable for subsequent low surface tension displacement of petroleum as the fluids are displaced through the formation by the drive water.

The use of many additives has been described in the literature for the purpose of decreasing the amount of surfactant adsorbed by the formation, including water soluble salts of carbonates, phosphates, fluorides, as well as quaternary ammonium salts. Unfortunately, many of the most effective sacrificial agents cannot be employed in processes being applied to formations containing water having dissolved therein relatively high concentrations of divalent ions such as calcium and magnesium because of the precipitation of insoluble calcium or magnesium salts which occurs when the injected chemicals contact the hard formation water. In formations containing high concentrations of divalent ions, water soluble lignosulfonate salts and related compounds can be used to reduce adsorption of surfactant, but they are expensive and not always entirely satisfactory for preventing loss of surfactant in the formation from the surfactant-containing fluid.

In view of the foregoing discussion, it can be appreciated that there is a significant unsatisfied commercial need for a surfactant waterflooding oil recovery method, especially one employing the synthetic surfactants which can be used in formations containing high salinity, hard water, without experiencing significant loss of surfactant from the surfactant-containing fluid to the formation mineral matrix. More particularly, there is a significant commercial need for a method of conducting a surfactant waterflooding oil recovery process in which the amount of additional oil recovered as a consequence of injecting the surfactant-containing fluid, is sufficient to justify the high cost of the surfactant waterflooding oil recovery process.

BRIEF DESCRIPTION OF THE PRIOR ART

U.S. Pat. No. 3,882,940 describes a tertiary oil recovery process in which a single slug of surfactant-containing oil recovery fluid is injected followed by alternating cycles of injecting slugs of gas and slugs of water.

U.S. Pat. No. 4,434,542 describes the use of a single slug of surfactant fluid followed by a single slug of polymer fluid in which the concentration of polymer is tapered or constantly deminished.

U.S. Pat. No. 3,421,582 describes an oil recovery method in which a first slug comprising surfactant dissolved in oil or water is injected followed by a second slug comprising surfactant dissolved in thickened water.

U.S. Pat. No. 3,915,230 describes an oil recovery process in which a controlled salinity thickened aqueous slug is injected and followed by an aqueous surfactant slug.

SUMMARY OF THE INVENTION

The present invention concerns a surfactant waterflooding oil recovery process, particularly one employing a surfactant tolerant of relatively high concentrations of salinity and/or divalent ions in the formation water. The surfactant is dissolved in water, and up to 5.0 and preferably from 1 to 3 volume percent hydrocarbon is dispersed in the aqueous surfactant fluid. Suitable hydrocarbons include $C_5$ to $C_{16}$ and preferably $C_{10}$ to $C_{12}$ hydrocarbons including aromatics and aliphatics. In a preferred embodiment the hydrocarbon contains an oil soluble silicone additive such as silicone grease. Surfactants suitable for use in this process include non-ionic surfactants such as polyethoxylated alkanols and polyethoxylated alkylphenols. Another class of surfactant especially suitable for use in this invention includes alkylpolyethoxy sulfate or alkylarylpolyethoxy sulfate, which are effective at salinity levels substantially greater than the above-described non-ionic surfactant, so long as the formation temperature is less than about 160° F. An especially preferred class of surfactant for use in the process of this invention include alkylpolyalkoxyalkylene sulfonates or alkylarylpolyalkoxyalkylene sulfonates, which are suitable for use in formations containing up to 240,000 parts per million total dissolved solids in the formation water, in formations whose temperatures are as high as 240° F. The foregoing surfactants may be used as substantially the only surfactant present in the surfactant fluid, or may be used in combination with an organic sulfonate surfactant such as petroleum sulfonate, alkyl sulfonate, alkylaryl sulfonate, or mixtures thereof. The use of these surfactants is generally described in numerous prior art references.

In applying the particular process of this invention, the total amount of surfactant-containing HC fluid to be injected into the formation is injected in the form of a plurality of separate, discrete slugs of surfactant HC fluid, alternatingly, injecting similarly small slugs of fluids comprising fresh water, e.g. salinities less than 10,000 parts per million and preferably less than 1000 parts per million total dissolved solids. Ordinarily from 2 to 15 and preferably from 3 to 6 separate slugs of surfactant HC are injected into the formation, the total volume of surfactant HC fluid being from 0.01 to 1.00 and preferably from 0.20 to 0.50 pore volumes based on the bore volume of formation to be affected by the injected surfactant HC fluid. The number of slugs of the fresh water injected alternatingly with the slugs of surfactant fluid will ordinarily be about the same as the number of surfactant slugs. The volume of each slug of fresh water is ordinarily from 0.5 to 5 and preferably from 1 to 2 times the volume of the immediately preceding surfactant slug. It is frequently convenient to make each succeeding slug of surfactant and each slug of fresh water about the same, although this is not essential. If the surfactant HC fluid contains a surfactant or mixture of surfactant HC selected or blended to achieve optimum performance at about the same salinity as the water present in the formation, then the salinity of the surfactant HC fluid should be from 50 to 100 and preferably from 80 to 100 percent of the salinity of the water present in the formation. After all of the slugs of surfactant HC fluid and slugs of fresh water are injected into the formation, a quantity of water containing a viscosifying amount of a hydrophilic polymer or other material capable of increasing the viscosity of the fluid is injected immediately after the surfactant fluid to achieve a favorable mobility ratio which insures more efficient displacement of the surfactant fluid . This in turn is followed by injecting a quantity of drive water or brine sufficient to displace all of the injected fluids through the formation.

DETAILED DESCRIPTION OF THE INVENTION

Surfactant waterflooding oil recovery processes as have been described in many prior art references, generally involve injecting a single quantity of surfactant fluid into the formation. Whatever surfactant is utilized, this fluid is followed by injecting water or an aqueous mobility-controlling fluid comprising water having dissolved therein a viscosifying amount of material such as a hydrophilic polymer, in order to insure favorable mobility ratio between the surfactant and subsequently-injected fluids necessary to achieve efficient sweep of the portion of the formation between the injection and production wells. As the injected surfactant-HC-containing fluid passes through the flow channels of the formation, it displaces oil which is not displaced by waterflooding because of the presence of the interfacial tension-reducing chemical in the surfactant HC fluid, which accomplishes displacement of petroleum from flow channels of the formation not depleted by waterflooding. Unfortunately, the surfactant HC fluid remains in the formation for very long periods of time, and retention of surfactant by the formation mineral matrix is a problem which apparently affects virtually all surfactant systems for waterflooding oil recovery processes. Moreover, the surfactant waterflooding processes designed for use in formations containing water whose salinity exceeds about 20,000 parts per million total dissolved solids employ relatively expensive synthetic surfactants which are effective for low surface tension oil recovery purposes at the salinity of the formation water, and these surfactants are adsorbed even more readily from the high salinity surfactant-containing fluid than are the simple organic sulfonates used in formations containing low salinity water. Loss of surfactant from the surfactant fluid is a serious problem affecting fluids which are essentially pure aqueous surfactant solutions, as well as emulsions or micellar dispersons.

I have discovered that surfactant losses can be reduced significantly in surfactant waterflooding processes employing a multiphase surfactant fluid, e.g. an emulsion or micellar dispersion, if the surfactant fluid is injected in the form of a plurality of relatively small slugs of surfactant fluid, with a similarly small slug of an isolation fluid comprising fresh water, e.g. salinity less than 10,000 parts per million and preferably less than 1000 parts per million total dissolved solids, or a fresh water solution of sacrificial agent, injected between succeeding slugs of surfactant fluid. The amount of oil recovered from a portion of formation contacted by the surfactant fluid is increased significantly by employing the process of this invention, as compared to a conventional surfactant water-flood oil recovery process employing essentially the same surfactant in the same concentration and using the same total amount of the surfactant fluid, except that the surfactant fluid is injected in the form of a single, large slug of surfactant fluid.

It is believed that there are several possible mechanisms, at least one of which may be responsible for the favorable results obtained by application of the process of this invention. One is based on the significantly lower ionic forces of the lower salinity fluid and lower divalent ions present between the entrapped oil droplets and its environments, such as the matrix and fluids. By cyclically reducing the ionic forces within the flow channels, oil-water emulsions become free to move under the influence of injected fluids, and also some of the surfactant becomes available for subsequent use downstream from the injection well. The second possible explanation for the improvement relates to the resolubilization of surfactant which has been entrapped or adsorped, either chemically or chemisorbed, because of the lower ionic forces at the lower water salinity and low divalent ion concentration present in the portion of the formation each time it is contacted by the low salinity fluid being injected sequentially between slugs of saline surfactant fluid. Finally, the presence of hydrocarbons and dissolved silicone grease in the surfactant solution have a tendency to repel the surfactant from adhering or adsorbing on the rock surface of the formation; therefore, reducing the loss of surfactant in the injected slugs. It is entirely possible that anyone of these mechanisms, or all, operate simultaneously to affect the observed increase in tertiary oil recovery by application of this process.

In applying the process of this invention, the total volume of surfactant fluid to be used will ordinarily be from 0.01 to 1.0 and preferably from about 0.20 to 0.50 pore volumes based on the pore volume of the portion of the formation to be contacted by the injected fluid. The number of slugs of surfactant used is from 2 to 15 and preferably from 3 to 6. The volume of each slug should be at least 5 percent and preferably at least 10 percent of the total volume of surfactant fluid used. The pore volume of each surfactant slug will be from 0.01 to 0.50 pore volumes and preferably from 0.05 to 0.2. The volume of each slug of fresh water or fresh water solution of sacrificial agent will be from 0.01 to 1.0 and preferably from 0.05 to 0.5 pore volumes. As used throughout this application, pore volumes is based on the pore volume of the formation within the recovery zone defined by the injection and production wells.

The surfactant fluid used in this process comprises a continuous aqueous phase and a discontinuous, dispersed non aqueous phase.

If this process is to be applied to a formation containing relatively high salinity formation water, and/or water containing relatively high concentrations of divalent ions, the aqueous phase of the surfactant fluid will ordinarily contain one or more of the following surfactants.

(1) In application to formations whose temperature is less than about 125° F., nonionc surfactants may be employed advantageously and they are somewhat less expensive than the more complex surfactants to be described below. Examples of suitable nonionic surfactants for use in this embodiment of the process of my invention are listed below.

(a) polyethoxylated alkanols or alkylphenols having the following formula:

$$RO(CH_2CH_2O)_xH$$

wherein R is an alkyl having from 5 to 20 and preferably from 8 to 16 carbon atoms, or an alkylaryl such as a benzene or toluene having attached thereto at least one alkyl chain, linear or branched, containing from 5 to 18 and preferably from 6 to 14 carbon atoms, and x is from 4 to 20 and preferably 6 to 16.

(b) Dipolyethoxylated amines having the following formula:

$$(CH_2CH_2O)_xH$$

$$R\text{-}H$$

$$(CH_2CH_2O)_yH$$

wherein R is an alkyl, linear or branched containing from 6 to 25 and preferably from 8 to 20 carbon atoms, or an alkylaryl such as benzene or toluene having attached thereto at least one alkyl group containing from 6 to 25 and preferably 8 to 20 carbon atoms, N is nitrogen, x and y are each 1 to 12 and the sum of x and y is from 2 to 24.

(c) A dipolyethoxylated alkyl catacol having the following formula:

$$O(CH_2CH_2O)_x H$$

$$R$$

$$O(CH_2CH_2O)_yH$$

wherein R is benzene or benzene having attached thereto a linear or branched alkyl having from 6 to 25 and preferably 8 to 20 carbon atoms, x and y are each 1 to 12 and the sum of x and y is from 2 to 24.

(2) A class of surfactants suitable for use in formations whose temperature is no greater than about 160° F., but which are effective in formations containing very high salinity water, i.e., water whose salinity is as high as 240,000 parts per million total dissolved solids, is an alkylpolyethoxy sulfate or alkylarylpolyethoxy sulfate having the following formula:

$$RO(CH_2CH_2O)_xSO_3M$$

wherein R is an alkyl or alkylaryl having from 6 to 24 and preferably from 8 to 18 carbon atoms in the alkyl chain, x is a number from 2 to 18 and preferably from 2 to 8, and M is a monovalent cation including sodium, potassium, lithium, or ammonium. The foregoing polyethoxy sulfate surfactant is quite effective in high salinity formations including hard brine formations, e.g. formations containing water whose salinity is as high as 240,000 parts per million total dissolved solids which may include as high as 10,000 parts per million divalent ions such as calcium and magnesium; however, this surfactant is prone to hydrolysis at elevated temperatures and so should not be used if the formation's temperature exceeds about 160° F.

(3) An especially preferred surfactant for high temperature, high salinity formations, is an alkylpolyalkoxyalkylene sulfonate or alkylarylpolyalkoxyalkylene sulfonate having the following formula:

$$RO(R'O)_xR''SO_3M$$

wherein R is an alkyl, linear or branched, having from 6 to 24 and preferably from 12 to 20 carbon atoms, or an alkylaryl such as benzene or toluene having attached thereto at least one alkyl group, linear or branched, and containing from 6 to 20 and preferably 6 to 16 carbon atoms, R' is ethylene or a mixture of ethylene and higher alkylene such as propylene with relatively more ethylene than higher alkylene, x is a number including fractional numbers from 2 to 18 and preferably from 2 to 8, R" is ethylene, propylene, hydroxypropylene, or butylene and M is a monovalent ion, preferably sodium, potassium, lithium or ammonium.

Any of the foregoing surfactants may be employed as substantially the only surfactant present in the aqueous phase of the surfactant fluid used in the process of this invention, or they may be used in combination with other surfactants. For example, the use of primary anionic surfactants, usually organic sulfonates such as petroleum sulfonates, alkyl sulfonates or alkylaryl sulfonates in combination with any of the above described more watersoluble synthetic surfactants, is a cost effective method for conducting surfactant waterflooding operations in a high salinity formation. Organic sulfonates are particularly effective and the preferred organic sulfonates for use in the process of this invention are those which are at least partially water soluble, preferably being comprised of species of varying equivalent weight over a relatively broad range and having an average equivalent weight in the range of about 350 to about 450. Alkyl or alkylaryl sulfonates having from 6 to 20 and preferably from 8 to 18 carbon atoms in the alkyl chains may also be employed. Ordinarily the water soluble sodium, potassium, lithium or ammonium salt of the above described organic sulfonate are utilized.

The concentration of the synthetic surfactants described above in the aqueous phase will ordinarily be in the range of from about 0.10 to 10.0 and preferably from about 0.5 to 3.0 percent by weight. In the instance of using a combination of surfactants such as is described in the foregoing paragraph, the concentration of the primary anionic organic sulfonate surfactant will be from 0.1 to 10.0 and preferably from 1.0 to 5.0 percent by weight. It is customary to maintain the ratio of primary anionic organic sulfonate surfactant to the solubilizing surfactant in the range of 0.1 to 10.0 and preferably from 0.2 to 3.0.

In addition to the above described surfactantcontaining aqueous phase, which is ordinarily the continuous phase of the surfactant fluid, the surfactant fluid also comprises at least one additional, non-aqueous phase which will be dispersed or emulsified in the aqueous phase. The preferred non aqueous fluid for incorporation in the surfactant fluid is a $C_5$ to $C_{16}$ and preferably a $C_{10}$ to $C_{12}$ range hydrocarbon fraction, aliphatic or aromatic, such as a distilled fractional cut from crude oil. Commercial hydrocarbon mixtures such as naptha, kerosene, diesel oil, natural gasoline, etc., are excellent hydrocarbons for this purpose. Essentially pure hydrocarbons, comprising relatively narrow range of carbon atoms, may be employed advantageously, although they are somewhat more expensive than the above described distillation cuts. Whole crude oil may be employed, providing it is a relatively high API gravity, e.g. greater than 45 API, although the preferred hydrocarbon are the first described lighter hydrocarbons or crude oil fraction. The volume percent of the hydrocarbon or other non aqueous material will be in the range up to 5.0 and preferably 1 to 3 percent by volume of the total surfactant fluid. The presence of hydrocarbon emulsified or dispersed in the surfactant fluid improves the performance of the surfactant fluid in several ways. The fluid viscosity is increased, which improves the conformance or volumetric displacement efficiency of the surfactant fluid as it is displaced through the oil containing formation. Furthermore, the presence of the dispersed, non aqueous phase improves the stability of the fluid and in some tests I observed a significant reduction in the amount of surfactant fluid absorbed from the fluid onto the formation matrix, or otherwise lost from the fluid to the formation rock or mineral surface. This is believed to be related to the fact that when a surfactant is employed, although it is designated as a water soluble material, it's solubility in water is limited and so the surfactant tends to accumulate at the interface between the aqueous and non aqueous phases.

While excellent results are obtained employing a surfactant fluid comprising the above described surfactantcontaining aqueous phase and the immediately above described non aqueous, dispersed phase, another, particularly preferred embodiment of my invention comprises a fluid in which there is dissolved in the dispersed, hydrocarbon phase, an oil soluble silicon compound. I have discovered a particularly preferred silicone compound for this embodiment is Dow Corning Valve Seal ®, a grease-like silicone compound which is non melting and non water soluble. The valve seal is sold and used as a lubricant and sealer under conditions of extreme temperature, chemical corrosion, etc. The concentration of oil soluble, water insoluble silicon compound employed in the dispersed, non aqueous phase of the surfactant fluid of my invention should be up to 15.0 and preferably from 5.0 to 10.0 percent by weight based on the non aqueous phase weight. Only those silicon compounds which further reduce, or at least which do not cause an increase in, the interfacial tension of the surfactant fluid, should be used in the this embodiment of my invention.

The total pore volume of surfactant solution employed in the process of this invention is approximately the same as is used in conventional processes described in the literature which is generally in the range of from 0.01 to 1.0 and preferably from 0.20 to 0.50 pore volume. Similarly, it is customary in state-of-the-art surfactant waterflooding processes to follow the surfactant fluid with a mobility-controlling fluid comprising water having dispersed or dissolved therein a sufficient amount of a viscosifying material to increase the viscosity of the fluid so as to insure a favorable mobility ratio between that fluid and the previously-injected surfactant fluid. Ordinarily from about 100 to about 2,000 and preferably from about 500 to 1500 parts per million hydrophilic polymers such as partially hydrolyzed polyacrylamides, copolymers of acrylamide and acrylic acid, as well as biopolymers such as polysaccharides which are commercially available for this purpose, achieve the desired favorable mobility ratio between the mobility fluid and the previously injected surfactant fluid. From 0.1 to 1.0 and preferably 0.20 to 0.50 pore volumes of mobility-controlling fluid is ordinarily employed and should be employed in a preferred embodiment of this process. The mobility-controlling fluid is injected after, usually immediately after all of the slugs of surfactant fluid and fresh water or fresh water solution of sacrificial agent have been injected. Field brine is injected next to displace mobilized oil and the previously injected fluids through the formation.

In applying the process of this invention, the total quantity of surfactant fluid is not injected into the formation in a single, large slug as is common practice in surfactant waterflooding operations described in the literature pertaining to surfactant waterflooding. Rather, the surfactant fluid is injected in relatively small slugs, separating the slugs of surfactant fluid by injecting similarly small slugs of fresh water or a fresh, aqueous fluid containing little or no surfactant, and having dispersed or dissolved therein an effective amount of a sacrificial agent, preferably a lignosulfonate or modified lignosulfonate as is described hereinafter below. The salinity of the fresh water or fresh water solutions of sacrificial agent should be no greater than 10,000 parts per million and preferably no greater than 1000 parts per million total dissolved solids.

In applying this process to high salinity formations, where surfactant loss is especially acute and where this process is particularly effective, the particular surfactants will be tailored and if a blend of surfactants is employed, the blend will be balanced so the surfactant is slightly soluble in water having a salinity about equal to the formation water, and additionally so the surfactant reduces the interfacial tension between the formation petroleum and the formation brine to a value less than about 100 and preferably less than about 10 millidynes per centimeter. Once the preferred surfactant species and/or blend is identified, it will be dispersed and/or dissolved in an aqueous fluid having a salinity which is from 50 to 100 and preferably from 80 to 100 percent of the salinity of the formation water. The desired amount of hydrocarbon, or hydrocarbon and silicone compound, is then dispersed in the surfactant solution to form the surfactant of this invention.

The pore volumes of fresh water or fresh water solutions of sacrificial agent employed sequentially with the separate slugs of surfactant fluid ordinarily equal the pore volumes of surfactant fluid used. In one preferred embodiment, the pore volumes of surfactant fluid and pore volume of fresh water injected sequentially therewith will be about equal, although this is not essential. The pore volume of each slug of fresh water or fresh, sacrificial agent-containing fluid should be from 0.5 to 5.0 and preferably from 1.0 to 2.0 times the pore volume of the slug of surfactant fluid injected immediately therebefore.

Similarly, a convenient and preferred method of operating according to the process of this invention comprises injecting slugs of surfactant fluid which are about equal to one another, although this is not necessary, and it is in fact desirable in certain applications to taper or vary the pore volume of succeeding slugs of surfactant fluid during the course of injecting all of the surfactant fluid into the formation.

FIELD EXAMPLE

For the purpose of illustrating a preferred mode of operating according to the process of this invention, the following pilot field example is offered. This is not intended to be in any way limitative or restrictive of the scope of this invention, however; rather it is offered only for the purpose of providing a complete disclosure including best modes of operating according to this process.

A subterranean, petroleum-containing formation having a porosity of 25 percent and a permeability of 500 md, has been exploited by primary production and secondary recovery, i.e., conventional waterflooding. At the conclusion of the waterflooding phase, the oil saturation remaining in the formation is about 35 percent and the total amount of oil originally in place in the formation which has been recovered is about 45 percent. The salinity of the water present in the formation at the time waterflooding operations must be terminated is about 100,000 parts per million total dissolved solids including 10,000 parts per million divalent ions, principally calcium plus lesser amounts of magnesium. The temperature is about 180° F. (82° C.). Because of the high salinity, high hardness and high temperature of this formation, the preferred surfactant is sodium nonylbenzenetriethoxypropylene sulfonate. The surfactant is quite effective when used as the only surfactant present in an aqueous fluid having a salinity of about 90,000 parts per million total dissolved solids, and the optimum concentration is 1.6 percent by weight (16 kilograms/meter$^3$).

The above described aqueous solution of nonylbenzenetriethoxypropylene sulfonate is employed as the continuous aqueous phase of the surfactant fluid. In addition to this, the fluid comprises a dispersed non aqueous phase, which is 1.8 percent by volume dodecane having dissolved therein 10 percent by weight (based on weight of hydrocarbon and silicone) Dow Corning Valve Seal ®, an oil soluble, water insoluble silicone compound which further decreases the interfacial tension of the surfactant fluid.

The formation has been exploited by means of a plurality of five-spot patterns, but only one unit is discussed in this pilot example. The producing wells are located at the corners of a square each side of which is 100 feet, with the injection well in the center of the square pattern. The formation thickness is approximately 42 feet and it is known that the volumetric efficiency of this pattern in a fluid displacement process is approximately 70 percent. Accordingly, the pore volume for this pattern which will be affected by injected fluids in the central injection well will be approximately $$100 \times 100 \times 42 \times 0.25 \times 0.7 = 73,500 \text{ cubic feet.}$$

One pore volume is approximately 550,000 gallons. A total of 30 percent pore volume of surfactant fluid, or 165,000 gallons, is employed in this pilot example. The fluid is comprised of 162,000 gallons of the above described aqueous solution containing the surfactant, plus 3,000 gallons of dodecane in which is dissolved about 1,900 pounds of Valve Seal ®, the oil soluble, water insoluble silicone compound which further decreases the interfacial tension of the surfactant fluid.

In order to achieve the maximum benefit of the process of this invention, it is decided that the above described quantity of surfactant fluid will be injected into the formation in five approximately equal slugs, each comprising 33,000 gallons of surfactant fluid. Thus the surfactant injection sequence involve injecting 33,000 gallons of surfactant fluid containing 1.6 percent by weight of the above described surfactant, the salinity of the fluid being about 90,000 parts per million total dissolved solids, followed by injection of about 33,000 gallons of fresh water. The salinity of the fresh water is about 1,000 parts per million total dissolved solids. Another 33,000 gallon slug of surfactant fluid is injected, followed by another 33,000 gallon slug of fresh water, until the entire 165,000 gallons of surfactant fluid and an equal volume, 165,000 gallons of fresh water, have been injected. After the last slug of the surfactant fluid and last slug of fresh water is injected, a mobility buffer fluid is injected as is commonly practiced in the art. This fluid comprises approximately 200,000 gallons of water whose salinity is about 900 parts per million total dissolved solids, containing about 1100 parts per million of a partially hydrolyzed poly-acrylamide hydrophilic polymer. After the last of the polymer fluid is injected, field brine containing 100,000 parts per million total dissolved solids is injected to displace all of the previously-injected fluids through the formation, with petroleum being recovered from the production wells until the fluid being recovered at those wells rises to a water cut in excess of 99 percent, indicating that all of the oil that can be recovered economically by this tertiary oil recovery process has been recovered from the formation.

EXPERIMENTAL SECTION

For the purpose of further illustrating and disclosing the novel process of this invention, and further to illustrate how the invention can be applied to particular environments and to illustrate the magnitude of results achieved from application thereof, the following laboratory work was performed and the observed results are described below.

A series of surfactant floods were performed on several Berea formation cores of varying lengths (from 6 inches to 6 feet) using a single surfactant-containing aqueous fluid. In all of the tests, the surfactant employed was a sodium dodecylbenzenepolyethoxyethylene sulfonate containing an average of 4.25 moles of ethylene oxide per mole of surfactant. The concentration of surfactant in all of the tests was 1.5 percent by weight (15 kilograms/meter$^3$). The salinity of the surfactant fluid was approximately 85,000 parts per million (85 kilograms/meter$^3$) total dissolved solids. These tests were conducted in connection with a study of a possible process for surfactant flooding in a formation containing water whose salinity was in the range of from 85,000 to 100,000 parts per million (85 to 100 kilograms/meter$^3$) total dissolved solids. Those runs employing hydrocarbon in the surfactant fluid used essentially pure dodecane. In those runs in which silicone grease was dissolved in the dodecane, the silicone employed was Valve Seal ® sold by Dow Chemical Company.

In all of the laboratory experiments described below, the cores were mounted in conventional laboratory flooding equipment, saturated with brine, then oil saturated, and next waterflooded to an oil saturation value approximating that existing at the conclusion of waterflooding in an oil formation. The surfactant fluid was then injected into the cores, followed by injecting a mobility-controlling fluid comprising 1000 parts per million of a polysaccharide polymer in water, and displaced by field brine having a salinity in the range of 85 to 100,000 parts per million total dissolved solids, until the water cut of the fluid being recovered from the core had risen to a value signifying completion of the test.

In the first three runs, runs A, B and C in Table I below, a single 0.33 pore volume slug of the above described saline surfactant-containing aqueous fluid was injected into the core as described above, followed by 0.33 pore volume slug of polymer solution, and completed by injecting brine, illustrating prior art methods of surfactant waterflooding. The three tests were conducted in cores whose lengths were 6 inches, 1 foot and 6 feet. The tertiary oil recovery in the short, 6-inch core was in the range of about 59 percent of the oil in place in the core, but decreased to about 54 percent in the 1-foot core and to about 42 percent in the 6-foot core. This clearly indicates that the surfactant fluid is effective for displacing oil from the pore channels of the formation in significant quantities, greater than that obtainable by waterflooding, but also shows the severity of the problem associated with loss of surfactant from the aqueous surfactant fluid to the formation material of which the core is composed. The rate of decline of tertiary oil recovery with increasing distance between injection and production point suggests that the process will be ineffective for recovering significant amounts of oil in application to formations in which the distance between the injection point and production point is significantly greater than the length of the longer core employed in these tests. For example, if the oil recovery vs. distance between injector and producer can validly be extrapolated, oil recovery using the single slug process as described in prior art references will decrease to about 22 percent if the injector producer distance is about 100 feet. This is clearly unsatisfactory and would not result in an economically viable surfactant waterflooding oil recovery process.

Another series of experiments were conducted in essentially the same manner as described above, using 3 berea cores of different lengths and the same surfactant fluids as were employed in runs A, B and C. The difference between the first series, runs A B and C, and the second series of tests, Runs D, E and F, was that while the same total amount of surfactant fluid was employed as was used in runs A, B and C, this quantity of surfactant fluid in runs D, E and F was divided into a number of small slugs and injected sequentially into the formation. Small slugs of fresh water (salinity no more than 100 parts per million total dissolved solids) were injected between successive slugs of surfactant fluid. The exact sequence of slugs injected in each of runs D, E and F was as follows:

(1) 0.11 pore volume of surfactant fluid;
(2) 0.22 pore volume of fresh water;
(3) 0.11 pore volume of surfactant fluid;
(4) 0.11 pore volume of fresh water;
(5) 0.11 pore volume of surfactant fluid;
(6) 0.33 pore volume of fresh water containing 1000 ppm Xanflood ® polymer, followed by 1.8 pore volumes of brine.

The same total volume of surfactant fluid and the same concentration of surfactant in that fluid was employed in this second set of experiments, Runs D, E and F, as were used in the first series, Runs A, B and C. The only difference between the two series of tests was that Runs D, E and F were conducted according to my discovery that improved surfactant waterflooding results from injecting the surfactant fluid in small, discrete slugs separated by similarly small slugs of fresh water. Comparing Runs A and D, which were conducted in equal length cores, it can be seen that injecting the fluid in a series of slugs with fresh water isolation slugs recovered 70 percent in Run D compared to 59 percent for Run A. Run E recovered 67 percent versus 54 percent for Run B. While a decline is noted in Run E compared to Run D as a consequence of inreasing the length of the core, the rate of decline is not as great as between Runs B and A, indicating the sequential surfactant slug injection technique will continue to exhibit improved performance at much greater distances. Run F was performed in a 2.0 foot core, and does not have a comparative analogue in the first series of experiments, although it can be seen that the rate of decline continued to be favorable.

In the third series of experiments, designated in the table below as Runs G, H and I, similar core flood tests were performed to those described above and designated Runs D, E and F. The principle difference between Runs G, H and I and the series of experiments designated as Runs D, E and F, was in the composition of the surfactant fluid. The total volume of surfactant fluid was the same, but rather than an aqueous surfactant solution, the fluid comprised an aqueous phase identical to that used in the runs described above plus a dispersed, non aqueous phase which was formulated by incorporating 2.0 volume percent of hydrocarbon dispersed in the aqueous phase. This non aqueous phase was comprised of 1.8 percent dodecane and 0.2 percent silicone grease. In Run G, which was conducted in a core whose length was 0.5 feet, the oil recovery was 74 percent. This is superior to Run D in which 70 percent recovery was obtained. Run H, with 66% recovery, performed in a 2.0 foot core, exceeded the recovery of Run F, (59%) which differed therefrom only in the composition of the surfactant fluid. Run I, performed in a 3.0 foot core, achieved 64 percent, illustrating that the rate of decline of oil recovery with core length is not serious when using the present invention. Runs G, H and I represent a particularly preferred embodiment of this invention, which illustrates an improvement in oil recovery effectiveness as compared to Runs D, E and F, representing an improvement described in another copending application, which in turn represents an improvement over the prior art technique illustrated by Runs A, B and C. The injection sequence employed in Runs G, H and I was identical to that described above for Runs D, E and F. The data are contained in Table I below.

TABLE I

| Run | Core Length Feet | Vol. % Hydrocarbon[1] in Surf Flood | Vol. % Silicone[2] | Method[3] | % Oil Recovery |
|---|---|---|---|---|---|
| A(6b E(1)) | 0.5 | 0.0 | 0 | I | 59 |
| B(12 E(1)) | 1.0 | 0.0 | 0 | I | 54 |
| C(72 E(2)) | 6.0 | 0.0 | 0 | I | 42 |
| D(6 E(4)) | 0.5 | 0.0 | 0 | II | 70 |
| E(12 E(2)) | 1.0 | 0.0 | 0 | II | 67 |
| F(24 E(3)) | 2.0 | 0.0 | 0 | II | 59 |
| G(6 CE(4)) | 0.5 | 1.8 | 0.2 | II | 74 |
| H(24 E(4)) | 2.0 | 1.8 | 0.2 | II | 66 |
| I(36 E(4)) | 3.0 | 1.8 | 0.2 | II | 64 |

[1] dodecane used as hydrocarbon in all floods
[2] The silicone used was Valve Seal® by Dow Chemical
[3] I - single slug of surfactant (prior art)
II - two or more slugs surfactant, successive slugs of surfactant separated by slug of deionized water.

I have found that if a single, large slug of surfactant fluid is followed by a single, large slug of fresh water equivalent in volume to the plurality of small slugs of fresh water, an increase in tertiary oil recovery is noted. The magnitude of the increase is less than that observed using plurality of slugs according to my invention, however. Also, the final oil recovery (at maximum water cut) is only achieved after injecting greater total quantities of liquid, which means the economic end of an enhanced oil recovery process will come at a much later time using a single terminal fresh water slug than in applying my invention. In a commercial field application, the difference in time to reach the economic cut-off point may be in the range of several years, which makes my process much more economical than one employing a single slug of fresh water. It must also be understood that if the surfactant fluid and fresh water are mixed on the surface and injected as a large, single slug, the oil recovery effectiveness will be greatly reduced, since the fluid salinity and surfactant concentration would both be reduced below the optimum level.

While the foregoing disclosure of the process of this invention has been described in a number of specific illustrative embodiments, this is not in any way limitative or restrictive of the true scope of this invention. Furthermore, while explanations have been offered for the improvements observed in applying this process, it is not necessarily represented that these are the only or even the primary mechanisms responsible for the improvements achieved. It is my intention that my invention be limited and restricted only by those limitations and restrictions appearing in the claims appended immediately hereinafter below.

I claim:

1. A method of recovering petroleum from a subterranean, petroleum-containing, permeable formation penetrated by at least one injection well and by at least one production well, said formation containing water having a salinity in excess of about 20,000 parts per million total dissolved solids, including known or determinable divalent ion concentration, comprising injection into the formation a predetermined volume of surfactant fluid, said surfactant fluid comprising a continuous aqueous phase containing at least one surfactant and a discontinuous, non aqueous phase, said surfactant being slightly soluble in a fluid having a salinity of from 50 to 100 percent of the salinity of the water present in the formation, and reducing interfacial tension between the petroleum and water to a value less than 100 millidynes/centimeter, said surfactant fluid being injected via the injection well and displacing petroleum through the formation toward the production well from which it is recovered to the surface of the earth, wherein the improvement comprises:

injecting the surfactant fluid into the formation in from 2 to 15 separate slugs, and separating successive slugs of surfactant fluid from one another by injecting sequentially therewith, separate isolation slugs of fluid comprising fresh water having salinity less than 10,000 parts per million total dissolved solids.

2. A method as recited in claim 1 wherein said non aqueous phase comprises hydrocarbon.

3. A method as recited in claim 2 wherein the volume percent of said hydrocarbon phase is up to 5.0 percent.

4. A method as recited in claim 2 wherein the volume percent of said hydrocarbon is from 1 to 3 percent.

5. A method as recited in claim 2 wherein said hydrocarbon comprises a $C_5$ to $C_{16}$ parafinic hydrocarbon.

6. A method as recited in claim 2 wherein said hydrocarbon comprises a $C_{10}$ to $C_{12}$ parafinic hydrocarbon.

7. A method as recited in claim 2 wherein said hydrocarbon is selected from the group consisting of crude oil and distilled fractions thereof.

8. A method as recited in claim 7 wherein said distilled fraction is selected from the group consisting of kerosene, naptha, natural gasoline, diesel oil, and mixtures thereof.

9. A method as recited in claim 2 wherein said hydrocarbon has dissolved therein an oil soluble silicone compound which is insoluble in water.

10. A method as recited in claim 9 wherein said silicone compound is a silicone grease.

11. A method as recited in claim 1 wherein the volume of each surfactant slug is at least 5 percent of the total volume of surfactant fluid.

12. A method as recited in claim 1 wherein the number of surfactant slugs is from 3 to 6.

13. A method as recited in claim 1 wherein the volume of each surfactant slug is at least 10 percent of the total volume of surfactant fluid.

14. A method as recited in claim 1 wherein the salinity of the isolation slugs is less than 1000 parts per million total dissolved solids.

15. A method as recited in claim 1 wherein the volume of each isolation slug is from 0.5 to 5.0 times the volume of the preceeding surfactant slug.

16. A method as recited in claim 15 wherein the volume of each isolation slug is from 1.0 to 2.0 times the volume of the preceeding surfactant slug.

17. A method of recovering petroleum from a subterranean, petroleum-containing, permeable formation penetrated by at least one injection well and by at least one spaced-apart production well, each well being in fluid communication with at least a portion of the formation, said formation containing water of known or determinable salinity and hardness comprising:
(a) injecting from 0.01 to 0.50 pore volumes of an aqueous saline, surfactant-containing fluid into the formation via the injection well, said fluid comprising a continuous aqueous phase containing from 0.1 to 10.0 percent by weight of a surfactant which is slightly soluble in said fluid and which reduces the interfacial tension between formation petroleum and said fluid to a value less than 100 millidynes per centimeter, and up to 5.0 volume percent of a nonaqeuous liquid dispersed in the aqueous phase;
(b) injecting from 0.1 to 1.00 pore volumes of an isolation slug comprising fresh water having a salinity which is no greater than 10,000 parts per million total dissolved solids, into the formation to displace the surfactant fluid away from the injection well;
(c) repeating steps (a) and (b) at least once;
(d) recovering petroleum displaced by the previously injected fluids from the formation via the production well.

18. A method as recited in claim 17 wherein the volume of the slug of surfactant fluid of step (a) is from 0.05 to 0.20 pore volumes.

19. A method as recited in claim 17 wherein the volume of the isolation slug of step (b) is from 0.05 to 0.50 pore volumes.

20. A method as recited in claim 17 wherein the number of slugs of surfactant fluid injected is from 2 to 15.

21. A method as recited in claim 17 wherein the number of slugs of surfactant fluid injected is from 3 to 6.

22. A method as recited in claim 17 wherein the salinity of the isolation slug is no more than 1,000 parts per million total dissolved solids.

23. A method as recited in claim 17 wherein the total concentration of surfactant in the surfactant-containing fluid is from 0.5 to 3.0 percent by weight.

24. A method as recited in claim 17 wherein steps (a) and (b) are repeated at least three times.

25. A method as recited in claim 17 wherein said nonaqueous phase comprises a hydrocarbons.

26. A method as recited in claim 25 wherein said hydrocarbon is a $C_5$ of $C_{16}$ hydrocarbon.

27. A method as recited in claim 25 wherein said hydrocarbon is selected from the group consisting of crude oil and distilled fractions thereof.

28. A method as recited in claim 27 wherein said distilled fraction is kerosene, naptha, natural gasoline, diesel oil, or mixture thereof.

29. A method as recited in claim 25 wherein the volume of hydrocarbon is from 1 to 3 percent.

30. A method as recited in claim 25 wherein said hydrocarbon has dissolved therein an oil soluble, water insoluble silicone compound.

31. A method as recited in claim 30 wherein the silicone compound is silicone grease.

32. A method as recited in claim 30 wherein the percent of silicone compound in the hydrocarbon is from 5 to 15 percent by weight.

* * * * *